United States Patent Office 3,249,419
Patented May 3, 1966

3,249,419
HERBICIDAL METHODS AND COMPOSITIONS
Robert T. Martin, Maui, Hawaii, assignor to The Dow Chemical Company, Midland, Mich., a corporation of Delaware
No Drawing. Filed June 21, 1963, Ser. No. 289,723
12 Claims. (Cl. 71—2.5)

This application is a continuation-in-part of my copending application Serial No. 191,311, filed April 30, 1962, now abandoned.

This invention relates to herbicides and is particularly directed to compositions and methods for killing or otherwise controlling the growth of weeds.

Weed as used in its broadest sense, namely, a plant which persists in growing where it is not wanted is a recognized nuisance. In agriculture, it is more than a nuisance. Weeds in approximately sixty major crops cause losses amounting to several billions of dollars per year. Losses in grazing lands from weeds and brush are estimated to be over 500 million dollars per year. Direct water losses and indirect losses deterring operational efficiency attributable to weeds in and around drainage and irrigation ditches and canals are inestimable. Serious fire hazards are created by weeds around industrial plants, refineries, tank farms and similar sites. Control of this menace is a continuing problem. Although the use of chemicals, particularly organic chemicals has greatly increased in recent years, they have not alleviated all the problems associated with weed control. Many of the materials when applied to the aerial portions of weeds accomplish top killing of foliage without killing the roots. The subsequent regrowth from the unaffected roots, oftentimes results in a more severe infestation than existed prior to treatment. Certain materials are totally ineffective against seeds while others may be effective only on immediate application to soil and are readily inactivated under soil conditions thereby rendering soil susceptible to reinfestation. Still others, because of their particular properties, have problems associated with handling, said problems of increasing significance in large scale operations. Thus, the usefulness of a herbicide must be determined not only with respect to effectiveness in the sought after property of plant kill but also with respect to problems of toxicity to man and animal life and to possible hazards to handling, transporting, storing, etc.

It is the object of the present invention to provide novel compositions and methods for the eradication of weeds. A further object is the provision of a method for the selective control of undesired vegetation present among desirable plant species. Other objects will become apparent from the following specification and claims.

According to the present invention, it has been discovered that germination and growth of undesirbale vegetation may be suppressed by applying to plant parts or to habitats of plants, a growth controlling or growth suppressing amount of a poly-halopyridine compound having a hydroxy containing substituent wherein said hydroxy containing group is either in the free hydroxy form or is in the salt or ester form. The hydroxy group may be directly attached to the pyridine ring or may be separated therefrom by a short chain. Hereinafter, these compounds will be referred to as hydroxy-halopyridine compounds. They may be represented by the formula

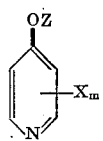

In this and succeeding formulas, X is cholo or bromo or mixtures thereof, Z is —H, —$C_nH_{2n}$OH, —M, D, —Q, —$C_nH_{2n}$OQ; wherein M is a metal salt group selected from alkali metal, alkaline earth metal, aluminum or transition group metal; D is a nitrogen base salt group selected from ammonium, quaternary ammonium, or a residue of alkylamine, alkanolamine, alkyleneamine or heterocyclic amine; Q is an organic or mineral acid ester group selected from the group consisting of acyl, aryloxyacyl, aroyl, aryl-acyl, lower alkylsulfonyl, arylsulfonyl, hydroxycarbonyl, lower alkoxycarbonyl, a carbonic acid moiety and a mineral acid moiety; wherein the organic acids forming the ester may be further substituted with halo, hydroxy, amino or nitro; and $m$ is an integer of from 3 to 4, inclusive; and $n$ is an integer of from 2 to 4, inclusive.

Representative metals of the metal salt group are sodium, potassium, zinc, manganese, magnesium, calcium, barium, aluminum, copper, iron, chromium, nickel and cobalt.

Representative bases which for the nitrogen base salt group are mono- or polybasic amines; akyl-, alkynyl-, alkenyl-, hydroxyalkyl- or mixed alkyl-hydroxyalkyl-amines, aralkylamines, alicyclic or homo- or heterocyclic amines; or ammonium or quaternary ammonium hydroxide. Typical suitable nitrogen bases are methylamine, ethylamine, isopropylamine, piperazine, 2,5-dimethyl-piperazine, ammonium hydroxide, tetramethylammonium hydroxide, tetraethylammonium hydroxide, n-propylamine, n-butylamine, pentylamine, n-hexylamine, n-heptylamine, iso-octylamine, trimethylamine, 1,3-dimethylbutylamine, diisopropylamine, N - methyl - isopropylamine, N-methyl-sec.-butylamine, 2-aminopropyl alcohol, 3-amino-n-pentanol, isopropanolamine, 2-amino-n-pentanol, methylaminoethanol, ethylaminoethanol, isopropylaminoethanol, n - butylaminoethanol, bis(2 - hydroxypropyl)amine, triethylamine, N, N - dimethyl-n-octylamine, tris(n-butyl)amine, ethanolamine, triisopropanolamine, triethanolamine, dimethylaminoethanol, diethylaminoethanol, dibutylaminoethanol, ethyldiethanolamine, dimethylamine, diethylamine, triisopropylamine, ethylenediamine, diethylenetriamine, triethylenetetraamine 1,2-propylenediamine, pyridine, α, β and γ-picolines, 5-ethyl-2-methylpyridine, morpholine, di-n-propylamine, ethylethanolamine, aminoethylethanolamine, 2-amino - 2 - methyl - 1 - propanol, diisopropanolamine, diethanolamine, tetraethylenepentamine, pentaethylenehexamine, cyclohexylamine, dicyclohexylamine, n-butyldiethanolamine and dimethylaminoethanol.

Representative radicals forming ester groups, i.e., acyl, aryloxy-acyl, aroyl, aryl-acyl, lower alkoxycarbonyl, lower alkylsulfonyl and arylsulfonyl which may be substituted with halo, hydroxy, amino or nitro and the carbonic and mineral acid moieties, include Acetyl,
Propionyl,
Butyryl,
Dimethylacetyl,
Chloroacetyl,
2,2-dichloropropionyl,
Octanoyl,
Heptanoyl,
Trichloroacetyl,
Hexanoyl,
Stearoyl,
2,2,3-trichloropropionyl,
α-Bromo-n-caproyl,
α-Bromoisobutyryl,
α-Bromoisovaleryl,
2,4-dichlorophenoxyacetyl,
Phenoxyacetyl,
2-methyl-4-chlorophenoxyacetyl,
2-(2,4,5-trichlorophenoxy)propionyl,
2,4,5-trichlorophenoxyacetyl,
2-(2,4-dichlorophenoxy)propionyl,
4-(2,4-dichlorophenoxy)butyryl,
4-(2-methyl-4-chlorophenoxy)butyryl,
2,3,6-trichlorobenzoyl,
3-amino-2,5-dichlorobenzoyl,
2,5-dichloro-3-nitrobenzoyl,
Benzoyl,
o-Toluyl,
m-toluyl,
2,6-dichlorobenzoyl,
o-Chlorobenzoyl,
m-Chlorobenzoyl,
p-Toluyl,
2,3-dichlorobenzoyl,
2,4-dinitrobenzoyl,
p-Nitrobenzoyl,
p-Chlorobenzoyl,
3,5-dinitrobenzoyl,
2-chloro-3,5-dinitrobenzoyl,
Phenylacetyl,
2,3,6-trichlorophenylacetyl,
m-Nitrophenylacetyl,
o-Nitrophenylacetyl,
p-Chlorophenylacetyl,
2,4-dichlorophenylacetyl,
3-phenylpropionyl,
4-(2,4-dichlorophenyl)butyryl,
3-(p-chlorophenyl)propionyl,
4-(o-chlorophenyl)butyryl,
Methylsulfonyl,
Ethylsulfonyl,
n-Octylsulfonyl,
Isopropylsulfonyl,
n-Amylsulfonyl,
n-Hexylsulfonyl,
sec.-Butylsulfonyl,
Phenylsulfonyl,
p-Tolylsulfonyl,
3,4-xylylsulfonyl,
p-Chlorophenylsulfonyl,
2,4-dichlorophenylsulfonyl,
2-methyl-4-chlorophenylsulfonyl,
Salicyloyl,
Carbonate,
Bicarbonate,
Nitrate,
Phosphate,
Phosphite,
Sulfite,
Sulfate,
Gluconate,
Citrate, and
Tartrate.

Where the expression "lower" is employed, it is meant to include as many as 8 carbon atoms on the particular groups so qualified.

The preferred embodiments of the present invention are (1) methods for the control of plant growth which comprises applying to foliage or plant growth media, a growth controlling dosage of a hydroxy-halopyridine compound; and (2) concentrate compositions useful for the controlling plant growth which comprise a hydroxy-halopyridine compound as active ingredient in intimate admixture with at least one material of the group consisting of finely divided inert solids, granular solids surface active dispersing agents, polyglycols, beeswax, paraffin waxes, water, organic solvents, nitrogen fertilizers, potassium fertilizers, phosphate fertilizers, ureaform, urea, metaphosphates, etc. Particularly contemplated as desirable concentrate compositions are those which comprise a hydroxy-halopyridine compound as active ingredient in intimate admixture with at least one material of the group consisting of finely divided inert solids, inert granular solids and surface active dispersing agents. Another type of useful concentrate compositions contemplated according to the present invention are aqueous concentrate compositions comprising hydroxy-halopyridine compounds as amine salts.

The expression "surface active dispersing agent" as herein employed is intended to include all agents which are capable of acting at the interfacial surface between the hydroxy-halopyridine compound or composition and water or organic solvent as the dispersion medium, facilitating thereby the dispersion of the toxicant in water or organic solvent to form aqueous and emulsifiable concentrates, etc. The term is inclusive of solid emulsifying agents such as finely divided bentonite, pyrophyllite, fuller's earth, attapulgite, silica, other clays and mineral carriers as well as liquid and solid ionic and non-ionic wetting and dispersing agents, alkaline earth metal caseinates, alkyl aryl sulfonates, sulfonated oils, complex organic ester derivatives, complex ether alcohols, condensation products of alkylene oxides with phenols and organic acids, polyoxyethylene derivatives of sorbitan esters, mahogany soaps. Other suitable surface active agents may be found in "Detergents and Emulsifiers, Up to Date," written and published by John W. McCutcheon, Inc., New York, 1962.

The term "finely divided inert solids" as herein employed refers to materials whose primary function is not as dispersant of hydroxy-halopyridine compounds in water or organic solvent but as carrier for dust compositions. Inclusion of such materials are chalk, talc, gypsum, powdered walnut shells, etc.

The term "inert granular solids" refers to mineral or other inert carriers which are suitable for dry application and which include corn cobs, sand and other materials which differ primarily in particle size from the "finely divided inert solids."

According to the present invention, the appropriate hydroxy-halopyridine compound may be compounded with any of the finely divided inert solids to form dust compositions by grinding, mixing or wetting the finely divided carrier with a solution of the toxicant in a volatile organic solvent. Similarly, dust compositions containing hydroxy-halopyridine compound may be compounded from the various of the solid surface active dispersing agents, such as bentonite, fuller's earth, attapulgite and other clays. Depending on the proportions of ingredients, these dust mixtures may be employed either as treating compositions or as concentrates to be subsequently diluted with additional solid surface active dispersing agent or with talc, chalk, gypsum, etc. to obtain the desired amount of toxicant in a composition adapted to be applied to plants or plant growth media for the suppression of plant growth. Also, such concentrate dust compositions may be dispersed in water or organic solvent with or without the aid of additional dispersing or emulsifying agent to form spray mixtures. Dust concentrates compounded from liquid hydroxy-halopyridine compounds generally contain from about 1 to about 30 percent by weight of the hydroxy-halopyridine compound, while those compounded from solid hydroxy-halopyridine compounds may contain from about 1 to about 95 percent by weight of the toxicant.

Dust concentrates such as above described or alternatively, appropriate hydroxy-halopyridine compounds may be intimately mixed with liquid or solid ionic or non-ionic dispersing agents to form spray concentrates. Such concentrates are readily dispersible in liquid carriers to form sprays containing the hydroxy-halopyridine compound in any desired amount.

The hydroxy-halopyridine compounds may be compounded with suitable water-miscible or water-immiscible organic liquids and surface active dispersing agents to produce liquid concentrates which may be further formulated with water and/or oil to prepare spray mixtures in the form of aqueous dispersions or oil-in-water emulsion compositions. The exact steps to be employed in preparing the compositions is within the knowledge of those skilled in the art. Preferred water-immiscible organic liquids include petroleum oil and distillates, toluene, xylene, cumene and other aromatic hydrocarbon solvents, chlorinated aliphatic hydrocarbons, isoparaffin oil and other aliphatic hydrocarbon solvents. Water-miscible organic solvents include acetone, methyl ethyl ketone, cyclohexanone, alcohols, dimethylformamide, ether alcohols of ethylene glycol marketed under trade names such as Dowanol and Cellosolve, and esters such as ethyl acetate, sec.-butyl acetate and isopropyl acetate. When the hydroxy-halopyridine compounds are alkali metal, ammonium or amine salts, aqueous concentrate compositions are readily prepared. The salts may be first compounded in a water-miscible organic solvent and added to a minimal amount of water or may be directly compounded in water or may be compounded in a water-organic solvent mixture. Usually, the use of a procedure which includes addition of a small amount of a water-miscible organic solvent is preferred. Moreover, in the case of salt compositions, the salt need not be preformed but may be prepared during the compounding process. Thus, the desired hydroxyhalopyridine and desired amine or inorganic base may be mixed together in appropriate amounts in an aqueous organic solvent mixture.

In the emulsifiable concentrates and other concentrate compositions described above, the hydroxy-halopyridine compounds may constitute from about 1 to about 95 percent by weight of the composition.

In a further embodiment of the present invention, the hydroxy-halopyridine compositions may contain other plant growth modifying agents either as adjuvants or supplementary materials for both terrestrial and aquatic applications. Representative plant growth modifying agents include 2-chloro-4,6-bis(ethylamino)-s-triazine;
2-chloro-4-ethylamino-6-isopropylamino-s-triazine;
2-methoxy-4,6-bis(isopropylamino)-s-triazine;
3-(p-chlorophenyl)-1,1-dimethylurea;
3-(p-chlorophenyl)-1,1-dimethylurea acetate;
3-phenyl-1,1-dimethylurea;
3-phenyl-1,1-dimethylurea trichloroacetate;
2,4-dichlorophenoxyacetic acid, its salts and esters;
2,4,5-trichlorophenoxyacetic acid, its salts and esters;
2-methyl-4-chlorophenoxyacetic acid, its salts and esters;
2-(2,4,5-trichlorophenoxy)propionic acid, its salts and esters;
Propylethyl-n-butylthiol carbamate;
Isopropyl N-(3-chlorophenyl)carbamate;
cis and trans-2,3-dichloroallyl-diisopropyl thiocarbamate;
ethyl di-n-propylthiocarbamate;
4-chloro-2-butynyl N-(3-chlorophenyl)carbamate;
2,3,6-trichlorobenzoic acid, its salts and esters;
2,3,5,6-tetrachlorobenzoic acid, its salts and esters;
2-methoxy-3,6-dichlorobenzoic acid, its salts and esters;
2,2-dichloropropionic acid, its salts and esters;
Trichloroacetic acid, its salts and esters;
4,6-dinitro-o-sec.-butylphenol;
3,5-dinitro-o-cresol; pentachlorophenol;
5-bromo-3-isopropyl-6-methyluracil;
Sodium arsenite;
Dimethylarsenic acid;
Tricalcium arsenate; sodium chlorate;
Sodium borates; 3,6-endooxohexahydrophthalic acid;
O-(2,4-dichlorophenyl)-O-methyl isopropylphosphoramidothioate;
3,4-dichloropropionanilide; 1,2-dihydroxy-pyridazine-3,6-dione;
3-amino-1,2,4-triazole;
2,3,6-trichlorophenylacetic acid, its salts and esters;
1,1'-ethylene-2,2'-dipyridylium bromide;
2,6-dinitro-N,N-di-n-propyl-2,2,2-trifluoro-p-toluidine;
α-chloro-N-diallylacetamide;
Herbicidal oils; and
Other inorganic salts and aliphatic, aromatic and heterocyclic organic compounds.

In carrying out the methods of the present invention, the hydroxy-halopyridine compound or compositions thereof are administered to foliage, plant parts or growth media of the plant species whose control is desired. The exact amount to be administered varies with the particular type of growth control to be achieved. It further varies with method of application, i.e., whether the application is to be made to foliage, fruit, flower or particular plant part, or to soil or other growth medium, and the overall locus of application, i.e., on the one hand, a sheltered area such as greenhouse, and on the other hand, an exposed area such as fields and railroad right-of-ways. Thus, for example, in the treatment of grass weeds, soil application is preferred to foliage application and the amounts are governed thereby. Also, weeds present in sheltered areas are more responsive to treatment and minimal dosages are usually adequate whereas field applications oftentimes require higher dosages to counteract adverse weather effects. An additional factor to be considered is the plant species to be treated, as well as the presence or absence of desirable plants together with the undesirable species. Thus, selective grass control may be achieved by administration of sufficient hydroxy-halopyridine compound to eradicate grasses without affecting broadleafs.

Effective control of terrestrial plants in soil may be achieved by the administration of as little as 0.001 p.p.m. (part by weight per million parts by weight of soil or growth medium). Except where selective growth control is sought, the upper limit is primarily a matter of economic practicability. Usually it is of no significant advantage to apply more than about 80 pounds per acre. Such administration provides a concentration of about 200 p.p.m. of hydroxy-halopyridine compound, distributed throughout 0.1 acre-foot. In general, it has been found that where dangers from weathering and reseeding are secondary, good results may be obtained by the application of from about 0.5 pound per acre to about 10 pounds per acre. Under field conditions, the preferred range is from about 1 pound per acre to about 20 pounds per acre. Certain hydroxy-halopyridine compounds may be employed for the selective control of grasses. Where administration is to be carried out providing for selective control of grasses, the desired range is from about 0.2 to about 50 p.p.m. while the desired range for broadleaf control is from about 25 p.p.m. to about 200 p.p.m. distributed throughout at 0.1 acre-foot. In foliar applications, it is preferred that the foliage of plants be contacted with compositions containing from about 1 ounce to about 16 pounds of hydroxy-halopyridine compound per 100 gallons of spray composition.

The administration of hydroxy-halpyridine compounds or compositions thereof to plants or plant growth media may be carried out in any manner known to the skilled in the art and may be carried out by using dusts, sprays or any other modification provided that an effective dosage is supplied. When the application is to be made by employing spray compositions, the concentration of the hydroxy-halopyridine compound in the spray composition generally runs from about 0.1 to about 50 percent by weight or higher. In dust compositions, the concentration of the active ingredient may be from about 1 to about 95 percent by weight. The total volume or weight of the treating compositions to be employed is not critical as long as the critical amounts of the hydroxy-halopyridine compound are supplied as previously set forth. Frequently, the desirability of a more concentrated or dilute composition depends on the method of application and area to be covered; hence, the selection of the concentration and total volume or weight may readily be made by the skilled in the art from the foregoing teachings.

The new dust and spray compositions may be applied to foliage or soil by conventional methods. Thus application may be made with power dusters, boom and hand sprayers and spray dusters or from planes. For soil application, the modified or unmodified compositions may be mechanically mixed with the soil, applied to the surface of soil and thereafter dragged or disced into the soil to a desired depth, or transported into the soil with a liquid carrier such as by injection, spraying or irrigation.

Although the conventional spraying and dusting methods are the preferred methods for carrying out the present invention in terrestrial plant growth control, it is not to be construed as being limited thereto. Thus, any method for administration of an effective dosage to soil or to the aerial portions of the plants and compositions for accomplishing these purposes employing hydroxy-halopyridine compound is considered to be embraced by the present invention. The invention is intended to embrace compositions and methods which utilize invert emulsion, wax bars, prills, granules, etc. The invention is also intended to embrace the use of hydroxy-halopyridine compound in connection with or as adjunct to other herbicidal materials. Compositions and methods which employ the hydroxy-halopyridine compound in conjunction with fungicidal or insecticidal material to accomplish multiple pest control objectives is also contemplated. Similarly, hydroxyl-halopyridine compounds used as herbicides may be added to soil with fertilizers so that the soil may be denuder of undesirable plants and be simultaneously put into readiness for the following growing season.

The following examples illustrate the invention but are not to be construed as limiting:

EXAMPLE 1

A concentrate composition was prepared by dissolving 58 milligrams of 2,3,5,6-tetrachloro-4-pyridinol in 2 milliliters of acetone containing 4 percent by volume of Protox 1A, and the resulting solution diluted to 24 milliliters with water containing 0.2 percent by volume of Triton X-100 (iso-octylphenyl polyethoxyethanol wetting agent). The concentrate composition was suitably diluted to prepare spray treating compositions containing 32, 16, 8 and 4 ounces of 2,3,5,6-tetrachloro-4-pyridinol per 100 gallons. In separate operations, the spray compositions were applied to the foliage of oat, cucumber and crab grass plants ranging from 4 to 6 inches in height in three replications. The treated plants as well as untreated checks were maintained in a greenhouse for 24 days and thereafter observed to determine the extent of kill of the plant species. The results indicated that at each spray concentration in all three replications of each plant species, the plants were dead whereas the check plants showed good continued growth.

EXAMPLE 2

In operations carried out in a manner similar to that described in Example 1, spray compositions containing 2,3,5-trichloro-4-pyridinol were prepared in concentrations of 32, 16 and 8 ounces per 100 gallons. The compositions were treated with aqueous sodium hydroxide to pH 7 by indicator paper to obtain sodium salt compositions of 2,3,5-trichloro-4-pyridinol; the resulting compositions were applied in three replications to the foliage of Johnson grass, crab grass and water grass. Seventeen days after application, the plants were examined and compared to untreated check plants to determine the extent of kill. The results expressed as average of three replications are given in the following table.

Table I

| Rate, oz./100 gals. | Percent kill | | |
|---|---|---|---|
| | Johnson grass | Crab grass | Water grass |
| 32 | 98 | 100 | 98 |
| 16 | 97 | 100 | 98 |
| 8 | 97 | 100 | 95 |

EXAMPLE 3

40 milligrams of 2,3,5-trichloro-4-pyridinol was dissolved in 2 milliliters of acetone containing 4 percent by volume of Protox 1A (a polypropylene glycol oleate non-ionic emulsifier, M.W. 700–800) and extended to 4 milliliters by the addition of water to produce a concentrate composition containing 10 milligrams of 2,3,5-trichloro-4-pyridinol per milliliter of composition. The concentrate composition was suitably diluted with water to obtain treating compositions of varying concentrations which were applied to the soil surface of pots having a surface area of 6.9 square inches per pot and containing from about 190 to 200 grams of air-dried soil. Thus, for example, a 1 milliliter portion of the concentrate composition was added to 29 milliliters of water and the resulting treating composition employed to drench the soil contained in a single pot, providing a treatment rate of 10 milligrams per pot or about 20 pounds per acre. Appropriate dilutions were then made and the diluted compositions applied to soil to provide treatment rates of 20, 10, 5 and 2.5 pounds per acre. The process was carried out in duplicate and the pots so treated as well as check pots were then seeded with various plant species, capped with about 85–90 grams of sand, watered as necessary to maintain soil moisture and observed twenty-one days after planting. The results are set forth in Table II.

Table II

| Plant species | Percent kill or growth reduction, pounds per acre | | | |
|---|---|---|---|---|
| | 20 | 10 | 5 | 2.5 |
| Bush beans | 100 | 100 | 99 | 95 |
| Carrot | 100 | 100 | 100 | 100 |
| Tomato | 100 | 100 | 100 | 100 |
| Cotton | 100 | 99 | 90 | 90 |
| Cucumber | 90 | 90 | 90 | 90 |
| Radish | 95 | 95 | 90 | 90 |
| Corn | 100 | 100 | 100 | 100 |
| Water grass | 100 | 100 | 100 | 99 |
| Johnson grass | 99 | 99 | 99 | 99 |
| Wheat | 100 | 100 | 100 | 100 |

EXAMPLE 4

In an operation similar to that described in Example 3, 2,3,5-trichloro-4-pyridinol was employed in treating soil seeded with different species of plants and at additional concentrations. The results are set forth in Table III.

Table III

| Rate, lbs./acre | Percent kill or growth reduction | |
|---|---|---|
| | Crab grass | Oats |
| 20 | 100 | 100 |
| 10 | 100 | 99 |
| 5 | 100 | 100 |
| 2.5 | 100 | 99 |
| 1.25 | 100 | 99 |
| 0.62 | 100 | 99 |
| 0.31 | 90 | 99 |
| 0.16 | 90 | 90 |
| 0.078 | 90 | 90 |
| 0.039 | 90 | 90 |
| 0.019 | 90 | 90 |
| 0.0098 | 90 | 90 |

EXAMPLE 5

In separate operations carried out in a manner similar to that described in Examples 3 and 4, herbicidal effectiveness in soil was determined for other hydroxy-halopyridine compounds.

Treating compositions containing 2,3,5,6-tetrachloro-4-pyridinol as toxicant were applied to soil at rates of 20, 10, 5, 2.5, and 0.62 pound per acre. The treated soil as well as check soil were then seeded to carrot, tomato and oat and maintained in the greenhouse for 23 days. Determination of growth control at the end of this period showed complete kill at all rates with all plant species whereas the checks of all plant species showed good germination and growth.

Treating compositions containing 2,3,5,6-tetrachloro-4-pyridyloxy)ethanol as toxicant were applied to soil at rates of 40, 20, 10, 5, 2.5 and 1.25 pounds per acre. The treated soil as well as untreated check soil were then seeded to oats and maintained in the green house for 20 days. Determination of growth control at the end of this period showed complete kill at all rates whereas the checks showed good germination and growth.

Treating compositions containing 2-(2,3,5-trichloro-4-pyridyloxy)ethanol as toxicant were applied to soil at rates of 40, 20, 10, 5 and 2.5 pounds per acre. The treated soil as well as untreated check soil were then seeded to crab grass, cucumber and oat and maintained in the greenhouse for 19 days. Determination of growth control at the end of this period showed complete kill at all rates with all plant species whereas the checks of all plant species showed good germination and growth.

In separate operations, treating compositions containing one of tris-2-(2,3,5-trichloro-4-pyridyloxy)ethyl phosphite and 2-(2,3,5-trichloro-4-pyridyloxy)ethyl propionate were applied to soil at a rate of 10 pounds per acre. Part of each of the treated soils was seeded to cucumber and another part of each to oats. Untreated check soil was also seeded to cucumber and oats. The seeds were then permitted to germinate and grow. After 14 days, examination of the planted soil revealed that where the seeds were planted in treated soil there was complete inhibition of germination and growth whereas the seeds planted in check soil were found to have germinated and exhibiting good growth.

In separate operations, treating compositions containing one of bis(2,3,5-trichloro-4-pyridyl) phthalate, 3,5-dibromo-2,6-dichloro-4-pyridinol and 2-bromo-3,5-dichloro-4-pyridinol were applied to soil at a rate of 10 pounds per acre and each of the treated soil seeded to oats. Untreated check soil was also seeded to the same plant species and both seeded treated and untreated soil maintained in the greenhouse for 14 days. Examination at the end of this period revealed that there was complete inhibition of germination and growth of the oat plants in the treated soil whereas there was good germination and growth of the plant in untreated soil.

EXAMPLE 6

In operations carried out in a manner similar to that above described, 2,3,5-trichloro-4-pyridyl acetate was employed to prepare soil drench compositions as previously described and applied to soil at several rates. The treated soil as well as untreated soil were planted with seeds of several plant species and maintained in the greenhouse for 20 days. At the end of this period, the germination and growth of the planted species were determined. The results are set forth in the following table.

Table VII

| Plant Species | Percent Kill or Growth Reduction, Pounds per acre | | | |
|---|---|---|---|---|
| | 40 | 20 | 10 | 5 |
| Crab grass | 100 | 100 | 100 | 100 |
| Oats | 100 | 100 | 100 | 100 |
| Cucumbers | 95 | 95 | 90 | 90 |
| Radishes | 100 | 100 | 100 | 100 |

EXAMPLE 7

In separate operations carried out in a manner similar to that described in Example 1, herbicidal effectiveness on foliage was determined for other hydroxy-halopyridine compounds.

Spray compositions were prepared as previously described containing 2,3,5,6-tetrochloro-4-pyridinol in concentrations of 2, 1 and 0.5 pounds per 100 gallons. In separate operations, the spray compositions were applied to the foliage of radish, bean and cucumber plants ranging from 4 to 6 inches in height. The treated plants as well as untreated checks were maintained in a greenhouse for one week and thereafter observed to determine the extent of kill of the plant species. The results indicated that at each spray composition and in each plant species, the plants were dead whereas check plants showed good continued growth.

Spray compositions containing 2,3,5-trichloro-4-pyridinol as active ingredient in concentrations of 2, 1 and 0.5 pounds per 100 gallons were prepared and applied in separate operations to foliage of radish plants. The treated plants as well as the untreated checks were maintained in the greenhouse for one week and thereafter observed. The results indicated complete kill of plants at each concentration whereas the check plants showed good continued growth.

EXAMPLE 8

In operations carried out in a manner similar to that described in Examples 1 and 2, foliar spray compositions were prepared wherein the active toxic ingredient was 2,3,5,6-tetrachloro-4-pyridinol, sodium salt of 2,3,5,6-tetrachloro-4-pyridinol, ammonium salt of 2,3,5,6-tetrachloro-4-pyridinol or triethylamine salt of 2,3,5,6-tetrachloro-4-pyridinol. Three concentrations of the spray compositions were prepared for each of toxicants: 32, 8 and 4 ounces per 100 gallons of spray composition. In separate operations, each of the compositions was applied to foliage of cucumber plants and the treated as well as untreated check plants were maintained in the greenhouse for 25 days. Observations made at the end of this period showed complete kills of cucumber plants with each toxicant at each concentration whereas the check plants showed excellent continued growth.

EXAMPLE 9

In an operation similar to that above described, 2,3,5,6-tetrachloro-4-pyridinol was employed to prepare spray composition containing the toxic ingredient in low concentration. A composition containing the toxic ingredient in 75 parts by weight per million parts of ultimate dispersion was sprayed on the foliage of cucumber plants and the treated as well as check plants maintained in the greenhouse for 15 days. Examination of the plants at the end of this period showed 90 percent growth reduction of the treated plants and profuse growth of the check plants.

EXAMPLE 10

Concentrate compositions are prepared as follows:

(A) 12 parts by weight of 2,3,5-tribromo-4-pyridinol, 58 parts by weight of xylene, 25 parts of dimethylsulfoxide and 5 parts by weight of Triton X-100 (iso-octylphenyl polyethoxyethanol) are mechanically mixed together to obtain an emulsifiable liquid composition.

(B) 5 parts by weight of 1-(2,3,5,6-tetrachloro-4-pyridoxy)-2-propanol, 88 parts by weight of attapulgite clay, 2 parts by weight of Daxad 27 (polymerized sodium salt of substituted benzoid alkyl sulfonic acid and 5 parts by weight of Acto 700 (an alkyl aryl sulfonate) are blended and hammermilled together to produce a water-dispersible mixture.

(C) 5 parts by weight of 2-(3,5,6-trichloro-2-pyridoxy)ethanol, 88 parts by weight of attapulgite clay, 5 parts by weight of Nacconol NR (sodium alkyl aryl sulfonate) and 2 parts by weight of Daxad 27 are blended and hammermilled together to produce a water dispersible composition.

(D) 10 parts by weight of 2,3,5-trichloro-4-pyridyl m-nitrobenzoate and 90 parts by weight of attapulgite clay are blended and hammermilled together to produce a dust composition.

(E) 5 parts by weight of 2,3,5-trichloro-4-pyridyl methane-sulfonate is dissolved in methylene chloride and sprayed on 95 parts by weight of 8/15 mesh granular Attaclay to produce a granular composition.

(F) 12 parts by weight of 2,3,5,6-tetrabromo-4-pyridinol, 58 parts by weight of xylene, 25 parts of dimethylsulfoxide and 5 parts by weight of Protox 7400 (a non-anionic-anionic blend of surface active agent) are mixed together to produce an emulsifiable mixture.

(G) 12 parts by weight of 2,3,5,6-tetrachloro-4-pyridyl ethane sulfonate, 20 parts by weight of dimethyl sulfoxide, 63 parts by weight of xylene and 5 parts by weight of Protox 7400 are mixed together to produce an emulsifiable mixture.

(H) 5 parts by weight of 2,3,5-trichloro-4-pyridyl 2,4-dichlorophenoxyacetate, 88 parts by weight of attapulgite clay, 2 parts by weight of Daxad 27 and 5 parts by weight of Acto 700 are blended and hammermilled together to produce a water-dispersible mixture.

(I) 12 parts by weight of 2,3,6-trichloro-4-pyridyl phenylacetate, 58 parts by weight of xylene, 25 parts of n-butyl acetate and 5 parts by weight of Triton X-100 are mechanically mixed together to produce an emulsifiable liquid composition.

(J) 12 parts by weight of 2,3,5-trichloro-4-pyridyl benzoate, 20 parts by weight of dimethyl sulfoxide, 63 parts by weight of So Cal Solvent #25 and 5 parts by weight of Protox 7400 are mixed together to produce an emulsifiable mixture.

(K) 10 parts by weight of 2,3,5-trichloro-4-pyridyl benzene sulfonate and 90 parts by weight of attipulgite clay are blended and hammermilled together to produce a dust composition.

(L) 12 parts by weight of 2,3,6-trichloro-4-pyridyl 2,4-dichlorobenzene sulfonate, 20 parts by weight of dimethyl sulfoxide, 63 parts by weight by xylene and 5 parts by weight of Triton X-100 are mechanically mixed together to produce an emulsifiable liquid composition.

(M) 2 parts by weight of 2-(2,3,5,6-tetrachloro-4-pyridoxy)butanol are intimately mixed with 98 parts by weight ammonium nitrate fertilizer to produce a soil treating composition.

(N) 5 parts by weight of 2,3,5,6-tetrachloro-4-pyridinol is dissolved in 95 parts by weight of fertilizer grade urea heated just to the melting point and the molten composition ejected from a heated nozzle into a cooling tower to produce a herbicidal urea prill.

(O) 10 parts by weight of 2,3,6-trichloro-4-pyridinol and 90 parts by weight of powdered walnut shells to produce a dust composition.

(P) 12 parts by weight of 2,3,5-trichloro-4-pyridinol, 13 parts by weight of triethylamine, 8 parts by weight of isopropyl alcohol and 67 parts by weight of water were mechanically mixed together to produce a water-soluble composition.

(Q) 12 parts by weight of 2,3,6-trichloro-4-pyridinol, 13 parts by weight of diethylaminoethanol, 8 parts by weight of isopropyl alcohol and 67 parts by weight of water are stirred together to produce a water-soluble composition.

EXAMPLE 11

Aqueous dispersions of 2,3,5-trichloro-4-pyridinol and 2,3,5,6-tetrachloro-4-pyridinol at varying concentrations were prepared as previously described. The compositions were applied as drench to rates of 40, 20, 10 and 5 pounds per acre. The treated as well as untreated soil were planted to oats and maintained in the greenhouse. Every seven days the germination and growth of plants were observed and compared with check plants. After grading, the plants were pulled out and the soil fallowed with only light daily watering. After 30 days, the soil was reseeded and the process repeated. This process was repeated every 30 days and it was found that after 8 months the soil treated with 2,3,5-trichloro-4-pyridinol or 2,3,5,6-tetrachloro-4-pyridinol gave substantially complete growth control of planted oat seeds.

EXAMPLE 12

In an operation carried out in a manner similar to that described in Example 3, it was found that complete controls of the germination and growth of oat plants were obtained when the soil was treated with 2-bromo-3,5,6-trichloro-4-pyridinol at a rate of 10 pounds per acre prior to planting.

In operations carried out in a manner similar to that described in Example 1, it was found that substantially complete controls of crab grass, oats, cucumbers and radishes were obtained when in separate applications 2-(2,3,5,6-tetrachloro-4-pyridoxy)ethanol and 2,3,6-trichloro-4-pyridinol were administered to the foliage of plant species.

EXAMPLE 13

In separate operations carried out in a manner similar to that described in Example 3, soil is treated at various rates with treating compositions comprising various hydroxy-halopyridine compounds and the treated soil planted with seeds of various broad-leaf and narrow-leaf plants and maintained in the greenhouse after planting and observed for a period of several weeks. Soil treated with 2,3,5,6-tetrachloro-4-pyridyl p-aminobenzenesulfonate,
2,3,5-trichloro-4-pyridyl 2,4,5-trichlorophenoxyacetate,
Calcium salt of 2,3,5-trichloro-4-pyridinol,
Copper salt of 2,3,5,6-tetrachloro-4-pyridinol,
2,3,5,6-tetrachloropyridyl aminoacetate,
Aluminum salt of 2,3,5-tribromo-4-pyridinol,
2,3,5-trichloropyridyl 2,2,3-trichloropropionate,
2,3,5,6-tetrachloro-4-pyridyl p-chlorobenzene sulfonate,
2-bromo-3,5,6-trichloro-5-pyridinol,
Bis(2,3,5,6-tetrachloro-4-pyridyl)carbonate,
Bis(2,3,5-trichloro-4-pyridyl)sulfate,
2,3,5,6-tetrachloro-4-pyridyl phosphate,
2-bromo-3,5-dichloro-4-pyridyl nitrate,
2,3,5,6-tetrachloro-4-pyridyl methanesulfonate,
2,3,5,6-tetrachloro-4-pyridyl-p-aminobenzenesulfonate,
2,3,5-tribromo-4-pyridyl 2,2,3-tribromopropionate, 2,3,5,6-tetrachloro-4-pyridyl phosphite,
2,3,5-tribromo-4-pyridyl taurinate,
Bis(2,3,5,6-tetrachloro-4-pyridyl) sulfite,
Bis(2-bromo-3,5-dichloro-4-pyridyl)tartrate,
2-bromo-3,5-dichloro-4-pyridyl bicarbonate,
2,3,5-tribromo-4-pyridyl 8-nitro-1-naphthoate,
2,3,5-tribromo-4-pyridyl 3-amino-2,5-dichlorobenzoate or
a bis(2,3,5,6-tetrachloro-4-pyridinol) salt with piperazine
shows good inhibitory controls in the germination and
growth of the various plant species.

EXAMPLE 14

In separate operations carried out in a manner similar to that described in Example 3, spray compositions are prepared comprising various hydroxy-halopyridine compounds and the compositions applied to the foliage of various broad-leaf and narrow-leaf plants growing in the greenhouse and observed over a period of several weeks. Plants treated with compositions comprising 2,3,5-trichloro-4-pyridyl 4-amino - 3,5 - dichlorobenzoate, 2,3,5,6-tetrachloro - 4 - pyridyl benzoate, 2,3,5,6-tetrachloro-4-pyridyl stearate, ammonium, sodium, octadecylamine, bis($\beta$-hydroxypropyl)amine and triethylamine salts of 2,3,5,6-tetrachloro-4-pyridinol show good controls of the various plant species.

EXAMPLE 15

In separate operations carried out in a manner similar to that described in Example 3, soil is treated at various rates with treating compositions comprising various hydroxy-halopyridine compounds and the treated soil planted with seeds of various broad-leaf and narrow-leaf plants and maintained in the greenhouse after planting and observed for a period of several weeks. Soil treated with ammnium, iron and manganese salts of 2,3,5,6-tetrachloro-4-pyridinol, aluminum, copper, $\alpha$-picoline, morpholine, diethylenetriamine, triethylenetetraamine and tetramethylammonium salts of 2,3,5-trichloro-4-pyridinol show good inhibitory controls in the germination and growth of the various plant species.

EXAMPLE 16

0.005 part by weight of 2,3,5,6-tetrachloro-4-pyridinol, 10 parts of an acetone solution containing 0.1 percent by weight of a dimeric alkylated aryl polyether alcohol (Triton X-155) and 90 parts of water are mixed together to provide a liquid water dispersible concentrate.

In a further operation, 50 parts by weight of 2,3,5-trichloro-4-pyridinol and 5 parts by weight of Triton X-155 are mixed together to provide a water-dispersible composition.

In a similar manner, 25 parts by weight of 2-(2,3,5-trichloro-4-pyridyloxy)ethanol, 10 parts by weight of Triton X-155, 20 parts of dimethylsulfoxide and 45 parts of xylene are mechanically mixed and ground together to provide an emulsifiable concentrate composition.

In still another operation, 0.005 part by weight of 2-(2,3,4,5-tetrachloro-4-pyridyloxy)ethanol, 10 parts of an acetone solution containing 0.1 percent by weight of Triton X-155 and 90 parts of water are mixed together to provide a liquid water dispersible concentrate.

The hydroxy-halopyridine compounds useful in carrying out the present invention may be prepared by heating the appropriate halopyridines with about 10 percent aqueous caustic at temperatures of from about 160° to about 190° C. for about 2 to 3 hours. The metal and amine salts of the hydroxy-halopyridines may be prepared by mixing equimolar or equivalent proportions of a hydroxy-halopyridine and base, preferably in a solvent or dispersion medium and thereafter evaporating to dryness. The esters may be prepared by heating together in an appropriate solvent, the sodium salt of the desired hydroxy-halopyridine and the acid chloride of the appropriate acid and thereafter filtering or washing out the sodium chloride by-product and recovering the ester by vaporizing off the solvent or by distillation. Other conventional procedures by preparing salts and esters may also be employed.

The preferred hydroxy-halopyridine compounds may be represented by the formula

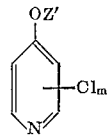

wherein Z' is —H, —C$_n$H$_{2n}$OH, —M', D', —Q' and C$_n$H$_{2n}$OQ'. In this formula $m$ is 3 or 4; $n$ is 2 to 4, inclusive; M' is an alkali or alkaline earth metal; D' is a nitrogen base salt group derived from ammonia or alkanol- or alkylamine containing from 1 to 18 carbon atoms, inclusive, Q' is acyl from 1 to 18 carbon atoms, aroyl from 7 to 8 carbon atoms, alkylsulfonyl from 1 to 3 carbon atoms, arylsulfonyl from 6 to 8 carbon atoms, hydroxycarbonyl, sulfate, phosphate or nitrate.

I claim:
1. A method for controlling the growth of vegetation which comprises applying to the area where control of vegetative growth is desired, a growth inhibiting amount of a hydroxy-halopyridine compound having the formula

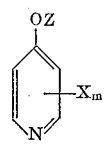

wherein each X is selected independently from the group consisting of bromo and chloro, and $m$ is an integer of from 3 to 4, inclusive; and Z is a radical selected from the group consisting of (1) —H, (2) —C$_n$H$_{2n}$OH wherein $n$ is an integer of from 2 to 4, inclusive, (3) —M wherein M is a metallic salt radical selected from the group consisting of alkali metals, alkaline earth metals, aluminum and transition metals selected from the group consisting of zinc, manganese, copper, iron, chromium, nickel and cobalt, (4) —D wherein D is a nitrogen base salt radical derived from a nitrogen base selected from the group consisting of (a) ammonia, (b) alkylamines containing from 1 to 18 carbon atoms, inclusive, (c) hydroxy-alkylamines containing from 2 to 10 carbon atoms, inclusive, (d) alkylenepolyamines containing from 2 to 10 carbon atoms, inclusive, (e) alicyclic amines having from 1 to 2 cyclohexyl groups, (f) piperazine amines containing from 0 to 2 methyl substituents, inclusive, (g) pyridine amines containing from 0 to 2 alkyl substituents, inclusive, selected from the group consisting of methyl and ethyl, (h) morpholine, and (i) lower tetraalkylammonium hydroxide containing from 4 to 8 carbon atoms, inclusive, (5) —Q wherein Q is an esterifying radical wherein said esterifying radical is derived from (a) carboxylic acids selected from the group consisting of (i) alkanoic acids containing from 1 to 18 carbon atoms, inclusive, (ii) haloalkanoic acids containing from 2 to 7 carbon atoms, inclusive, and from 1 to 3 halogen atoms, inclusive, (iii) arylcarboxylic acids inclusive of dicarboxylic acids and containing from 7 to 11 carbon atoms, inclusive, and from 0 to 3 substituents, inclusive, selected from the group consisting of nitro, chloro, amino and hydroxy, (iv) aryloxyalkanoic acids containing from 8 to 11 carbon atoms, inclusive, and from 0 to 3 chlorine atoms, inclusive, in the aryl portion of the radical, (v) aralkanoic acids containing from 8 to 10 carbon atoms, inclusive, and from 0 to 3 substituents, inclusive, selected from the group consisting of chloro and nitro, (vi) aminoalkanoic acid containing 2 carbon atoms and 1 amino group, and (vii) hydroxyalkanoic acids containing from 1 to 5 hydroxy radicals, inclusive, and from 1 to 3 carboxyl radicals, inclusive, (b) sulfonic acids selected from the group consisting of (i) alkylsulfonic acids containing from 1 to 8 carbon atoms, inclusive, (ii) aminoalkylsulfonic acid containing 2 carbon atoms and 1 amino group and (iii) arylsulfonic acids containing 6 to 8 carbon atoms from 0 to 2 substituents, inclusive, selected from the group consisting of amino, methyl and chloro, (c) carbonic acid, and (d) mineral acid selected from the group consisting of nitric acid, phosphoric acid, phosphorous acid, sulfurous acid and sulfuric acid, and (6) —$C_nH_{2n}OQ$ wherein Q and $n$ are as above defined.

2. A method according to claim 1 wherein the hydroxy-halopyridine compound is applied to plant growth medium.

3. A method according to claim 1 wherein the hydroxy-halopyridine compound is applied to aerial portions of plants.

4. A method according to claim 1, wherein the hydroxy-halopyridine compounds is 2,3,5,6-tetrachloro-4-pyridinol.

5. A method according to claim 1 wherein the hydroxy-halopyridine compound is 2,3,5-trichloro-4-pyridinol.

6. A method according to claim 1 wherein the hydroxy-halopyridine compound is 2-(2,3,5,6-tetrachloro-4-pyridoxy)ethanol.

7. A method according to claim 1 wherein the hydroxy-halopyridine compound is 2-(2,3,5-trichloro-4-pyridoxy)ethanol.

8. A method according to claim 1 wherein the hydroxy-halopyridine compound is 2,3,6-trichloro-4-pyridinol.

9. A method according to claim 1 wherein the hydroxy-halopyridine compound is 2,3,5,6-tetrachloro-4-pyridyl acetate.

10. A method according to claim 1 wherein the hydroxy-halopyridine compound is 2,3,5-trichloro-4-pyridyl acetate.

11. A method according to claim 1 wherein the hydroxy-halopyridine compound is 2,3,5-trichloro-4-pyridyl methanesulfonate.

12. A herbicidal concentrate composition which comprises a growth inhibiting amount of a hydroxy-halopyridine compound as active ingredient in admixture with a finely divided inert solid and a surface active dispersing agent, wherein said hydroxy-halopyridine compound has the formula

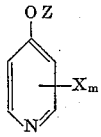

wherein each X is selected independently from the group consisting of bromo and chloro, and $n$ is an integer of from 3 to 4, inclusive; Z is a radical selected from the group consisting of (1) —H, (2) —$C_nH_{2n}OH$ wherein $n$ is an integer of from 2 to 4, inclusive, (3) M wherein M is a metallic salt radical selected from the group consisting of alkali metals, alkaline earth metals, aluminum and transition metals selected from the group consisting of zinc, manganese, copper, iron, chromium, nickel and cobalt, (4) D wherein D is a nitrogen base salt radical derived from a nitrogen base selected from the group consisting of (a) ammonium, (b) alkylamines containing from 1 to 18 carbon atoms, inclusive, (c) hydroxyalkylamines containing from 2 to 10 carbon atoms, inclusive, (d) alkylenepolyamines containing from 2 to 10 carbon atoms, inclusive, (e) alicyclic amines having from 1 to 2 cyclohexyl groups, (f) piperazine amines containing from 0 to 2 methyl substituents, inclusive, (g) pyridine amines containing from 0 to 2 alkyl substituents, inclusive selected from the group consisting of methyl and ethyl, (h) morpholine, and (i) lower tetraalkylammonium hydroxide containing from 4 to 8 carbon atoms, inclusive, (5) Q wherein Q is an esterifying radical wherein said esterifying radical is derived from (a) carboxylic acids selected from the group consisting of (i) alkanoic acids containing from 1 to 18 carbon atoms, inclusive, (ii) haloalkanoic acids containing from 2 to 7 carbon atoms, inclusive, and from 1 to 3 halogen atoms, inclusive, (iii) arylcarboxylic acids inclusive of dicarboxylic acids and containing from 7 to 11 carbon atoms, inclusive, and from 0 to 3 substituents, inclusive, selected from the group consisting of nitro, chloro, amino and hydroxy, (iv) aryloxyalkanoic acids containing from 8 to 11 carbon atoms, inclusive, and from 0 to 3 chlorine atoms, inclusive, in the aryl portion of the radical, (v) aralkanoic acids containing from 8 to 10 carbon atoms, inclusive, and from 0 to 3 substituents, inclusive, selected from the group consisting of chloro and nitro, (vi) aminoalkanoic acid containing 2 carbon atoms and 1 amino group and (vii) hydroxyalkanoic acids containing from 1 to 5 hydroxy radicals, inclusive and from 1 to 3 carboxyl radicals, inclusive, (b) sulfonic acids selected from the group consisting of (i) alkylsulfonic acids containing from 1 to 8 carbon atoms, inclusive, (ii) aminoalkylsulfonic acid containing 2 carbon atoms and 1 amino group and (iii) arylsulfonic acids containing 6 to 8 carbon atoms and from 0 to 2 substituents, inclusive, selected from the group consisting of amino, methyl and chloro, (c) carbonic acid, and (d) mineral acid selected from the group consisting of nitric acid, phosphoric acid, phosphorous acid, sulfurous acid and sulfuric acid, and (6) —$C_nH_{2n}OQ$ wherein Q and $n$ are as above defined.

References Cited by the Examiner

FOREIGN PATENTS 1,170,743  9/1958  France.

OTHER REFERENCES

Hertog et al.: "Rec. Trav. Chim.," vol. 74 p. 59 (1953).

Klingberg: "Pyridine and Its Derivatives," Interscience Publishers, 1962, pages 792 and 796.

Sell et al.: "J. Chem. Soc.," vol. 75, pp. 979–986.

Sell et al.: "J. Chem. Soc.," vol. 83, pp. 396–401.

Thompson et al.: Botanical Gazette, vol. 107, pages 476 to 507 (pages 500 and 502 particularly relied upon), 1946.

LEWIS GOTTS, *Primary Examiner.*

JULIAN S. LEVITT, *Examiner.*